United States Patent [19]

Takahashi

[11] Patent Number: 5,621,709
[45] Date of Patent: Apr. 15, 1997

[54] TRACKING SERVO APPARATUS

[75] Inventor: Hiroyuki Takahashi, Tokorozawa, Japan

[73] Assignee: Pioneer Electronic Corporation, Tokyo, Japan

[21] Appl. No.: 676,002

[22] Filed: Mar. 27, 1991

[30] Foreign Application Priority Data

Jun. 26, 1990 [JP] Japan ..................... 2-168125

[51] Int. Cl.$^6$ ...................................... G11B 7/00
[52] U.S. Cl. .................. 369/44.32; 369/43; 369/44.28
[58] Field of Search .................... 369/43, 44.26, 369/44.27, 44.28, 44.29, 44.32, 44.35, 44.34; 358/342, 907; 360/77.02, 78.04, 78.06

[56] References Cited

U.S. PATENT DOCUMENTS

| 4,486,790 | 12/1984 | Sugiyama | 369/43 |
|---|---|---|---|
| 4,805,163 | 2/1989 | Ohnuki | 369/44.32 |
| 4,817,073 | 3/1989 | Suzuki | 369/44.28 |
| 4,932,013 | 6/1990 | Kojima | 369/44.28 |
| 4,985,882 | 1/1991 | Tanaka et al. | 369/44.34 |
| 5,056,074 | 10/1991 | Tateishi et al. | 369/44.28 |
| 5,065,383 | 11/1991 | Tateishi et al. | 369/44.28 |

FOREIGN PATENT DOCUMENTS

| 0296338 | 12/1988 | European Pat. Off. . |
|---|---|---|
| 0309704 | 8/1988 | Germany . |
| 58-128055 | 7/1983 | Japan . |
| 63-17171432 | 7/1988 | Japan . |
| 1260679 | 10/1989 | Japan . |
| 2027529 | 1/1990 | Japan . |
| 2079224 | 3/1990 | Japan . |

*Primary Examiner*—Georgia Y. Epps
*Assistant Examiner*—Nabil Hindi
*Attorney, Agent, or Firm*—Sughrue, Mion, Zinn, Macpeak & Seas

[57] ABSTRACT

A tracking servo apparatus having a device for detecting the degree of disk eccentricity. At least either the pulse width or the peak value of brake pulses is controlled upon track jump in accordance with the detected degree of disk eccentricity. This allows jumps to be always carried out stably regardless of the disk eccentricity involved.

4 Claims, 2 Drawing Sheets

TRACKING SERVO APPARATUS

BACKGROUND OF THE INVENTION

1. Field of the Invention

The present invention relates to a tracking servo apparatus for use with information-recorded disk players.

2. Description of the Background Information

The tracking servo apparatus is an indispensable part of disk players playing recording mediums such disks as video and compact audio disks (hereinafter simply referred to as disk). The servo apparatus controls the position of an information reading spot of the disk player's pickup so that a recording track of the disk currently being played is always followed accurately irrespectively of any disk defects or eccentricities that may exist.

In operation, the tracking servo apparatus generates a tracking error signal in response to the degree of defect or eccentricity of the information reading spot in the disk radius direction with respect to the recording track on the disk. In accordance with the tracking error signal, an actuator is driven to shift the information reading spot in the disk radius direction. This is a closed loop control system that provides positional control over the recording tracks on the disk.

Where a jump is to be made to a particular track on the disk, the tracking servo apparatus opens the servo loop and applies kick pulses to the actuator. At a predetermined point in time during the jump, e.g., at the zero crossing of the tracking error signal which occurs when the reading spot is positioned in the middle between tracks, brake pulses are applied to the actuator. Then at a suitable point in time, the servo loop is closed and the servo mechanism is retracted.

The track pitch on the disk is fixed according to predetermined standards. Thus for a one-track jump under track jump control, which was described above, the pulse width of kick pulses is set as desired within the period up to the zero crossing of the tracking error signal, whereas the pulse width of brake pulses is predetermined as constant relative to the track pitch. That is, the braking energy determined by the pulse width and peak value of the brake pulses remains constant.

However, an eccentric disk has varying jump distances according to the degree of eccentricity despite the fixed track pitch. For this reason, with the pulse width and peak value of brake pulses held constant, the braking energy gets too high or too low, making it impossible to perform stable jump operations. In FIG. 3, part (a) shows a case where no disk eccentricity exists. In this case, stable jump operations are carried out by the kick pulses having the pulse width and peak value depicted as well as by brake pulses in response to a tracking error signal TE.

The part (b) of FIG. 3 shows a case where the disk has forward eccentricity in the jump direction, the braking energy is too high despite the fact that the information reading spot moves at a low speed relative to the disk in the radius direction on the disk. The part (c) of FIG. 3 shows a case where the disk has reverse eccentricity in the jump direction, the braking energy is too low despite a high relative speed of the information reading spot in the disk radius direction.

SUMMARY OF THE INVENTION

It is therefore an object of the present invention to provide a tracking servo apparatus capable of stably executing jump operations regardless of the disk eccentricity that may be involved.

According to the invention, there is provided a tracking servo apparatus including a servo loop which opens in response to a jump command to initiate a jump and which closes at the end of the jump, the servo loop having means for generating a tracking error signal in response to the degree of eccentricity of an information reading spot of a pickup in the disk radius direction relative to a recording track of a disk, and actuating means for positionally compensating the information reading spot in the disk radius direction in accordance with the tracking error signal, the apparatus comprising pulse applying means for applying kick pulses to the actuating means when the jump command is generated and for applying brake pules thereto at a predetermined point in time during the jump, eccentricity detecting means for detecting the degree of eccentricity of the disk, and a control means for varying at least either the pulse width or the peak value of the brake pulses in accordance with the degree of eccentricity.

In the tracking servo apparatus according to the invention, kick pulses are applied to the actuating means for moving the information reading spot of the pickup in the disk radius direction upon generation of a jump command to initiate a jump and brake pulses are applied thereto at a predetermined point in time during the jump. Furthermore, the degree of disk eccentricity is detected and at least either the pulse width or the peak value of the brake pulses is varied in accordance with the detected degree of disk eccentricity.

DESCRIPTION OF THE PREFERRED EMBODIMENT

A preferred embodiment of the present invention will now be described with reference to the accompanying drawings.

Figure 1:
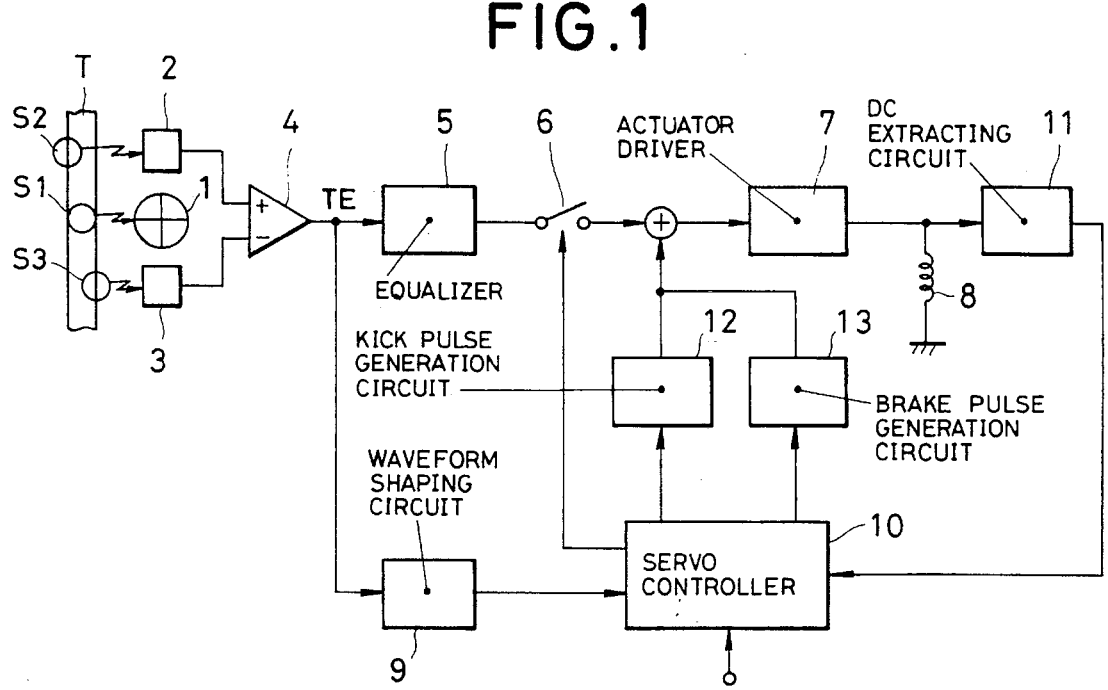
FIG. 1 is a block diagram of a tracking servo apparatus embodying the present invention.

FIG. 1 is a block diagram of a tracking servo apparatus according to the present invention. In FIG. 1, there are shown three beam spots $S_1$, $S_2$ and $S_3$, each obtained by conversing a laser beam. The recorded information reading spot $S_1$ is maintained in the illustrated positional relations to a pair of tracking information detecting spots $S_2$ and $S_3$. That is, the spot $S_2$ precedes the spot $S_1$ and the spot $S_3$ follows $S_2$ as the spot $S_1$ moves relative to the disk. The three beam spots emanate from a pickup, not shown, onto a recording track T on the disk. The reflected light from these beam spots enters photoelectric conversion devices 1, 2 and 3 incorporated in the pickup.

Figure 3:
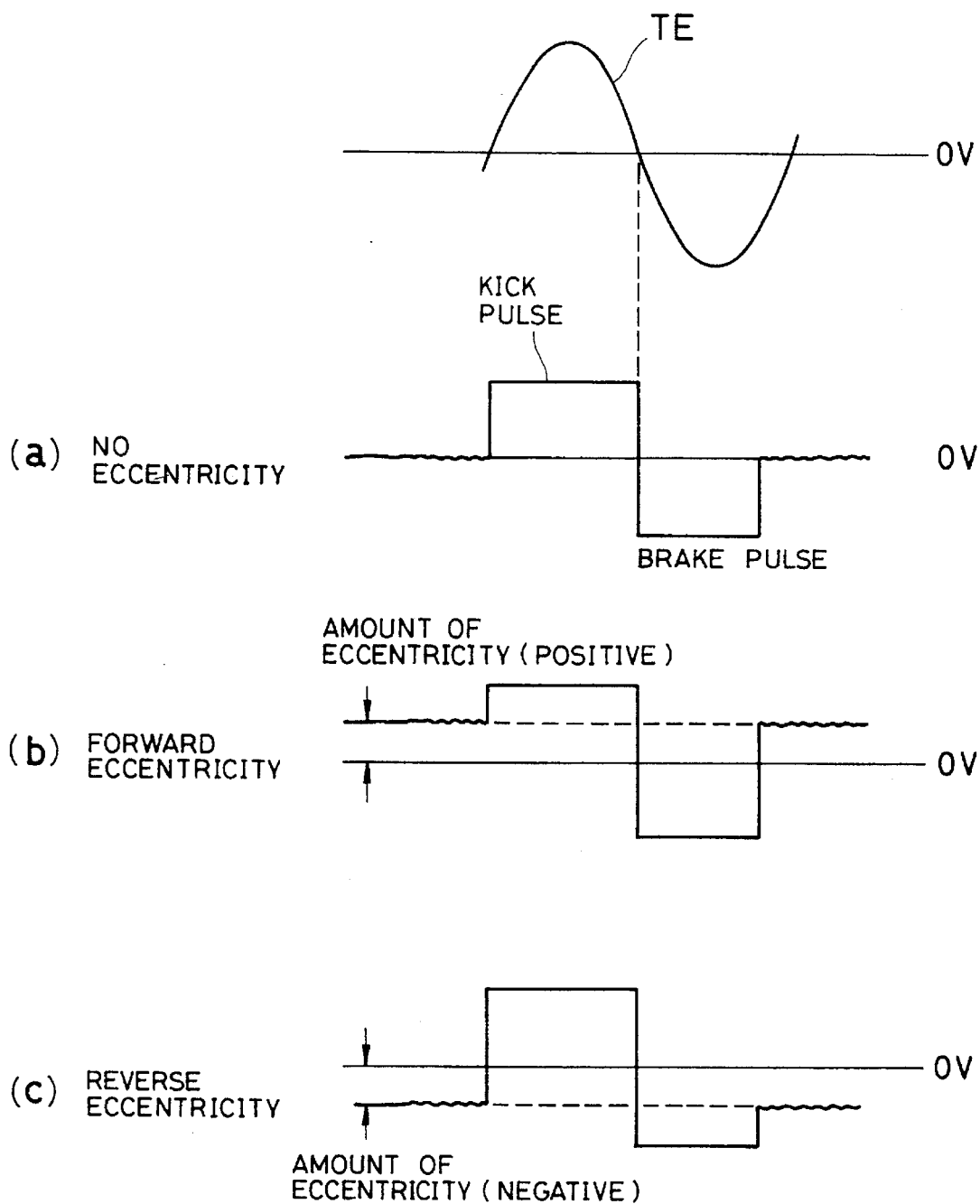
FIG. 3 is a waveform diagram showing kick pulses and brake pulses generated in response to a tracking error signal TE when the disk has no eccentricity (part (a)), when the disk is eccentric in the forward direction (part (b), and when the disk is eccentric in the reverse direction (part (c)).

The photoelectric conversion device 1 is composed of four independent light-receiving elements which are formed as if the device were divided into four equal parts by two perpendicularly intersecting lines on the light-receiving surface thereof. The total output of these elements provides a read (RF) read radio frequency signal. The outputs from the two photoelectric conversion devices 2 and 3 are supplied to a differential amplifier 4 where the difference between the two outputs is obtained. The differential output from the amplifier 4 constitutes a tracking error signal TE. When the beam spots $S_1$–$S_3$ move from one recording track 1 to another in a jump operation, the tracking error signal TE exhibits a sine waveform depicted in FIG. 3. The level of the tracking error signal TE is in proportion to the degree of eccentricity of the information reading spot $S_1$ with respect to the recording track T. The zero crossing point of the tracking error signal TE corresponds to the center of the recording track T as well as to the middle between tracks. After being compensated by an equalizer 5 in terms of frequency characteristic, the tracking error signal TE is supplied to an actuator (coil) 8 of the pickup via an actuator driver 7. In turn, the actuator 8 moves the spot $S_1$ in the disk radius direction according to the tracking error signal level so that the spot $S_1$ accurately follows the recording track T. A tracking servo loop is formed in the manner described above.

The tracking error signal TE is also supplied to a waveform shaping circuit 9. The waveform shaping circuit 9, which may be, for example, made of a zero crossing comparator, shapes the tracking error signal TE into a pulse signal and supplies it to a servo controller 10. As means for detecting the degree of disk eccentricity, there is provided a direct current (DC) extracting circuit 11 comprising a low pass filter. The DC extracting circuit 11 extracts the DC component of a driving signal that drives the actuator 8. If the disk is found to be defective or eccentric, the signal that drives the actuator 8 varies in the manner of a sine wave, with one disk revolution made per cycle. The polarity of the sine wave corresponds to the direction of disk eccentricity, and the peak value thereof corresponds to the degree of disk eccentricity. The DC component extracted by the DC extracting circuit 11 is supplied to the servo controller 10.

The servo controller 10, made of a microcomputer, opens and closes a loop switch 6. With the loop switch 6 opened, i.e., in a loop open state, a kick pulse generation circuit 12 and a brake pulse generation circuit 13 generate kick pulses and brake pulses respectively, with suitable timings, the two kinds of pulses being opposite in polarity. These pulses are applied past the actuator driver 7 to the actuator 8 to perform a jump. The servo controller 10 also controls the timings for generating the kick and brake pulses as well as the pulse width or peak value of the brake pulses.

That is, the servo controller 10 obtains the degree of disk eccentricity by detecting the peak value of the sine waveform supplied by the DC extracting circuit 11. Then the servo controller 10 determines the timing for generating kick pulses based on the sine waveform so that the jump is always carried out in the determined direction of eccentricity. Using the pulse signal from the waveform shaping circuit 9, the servo controller 10 detects the timing for the zero crossing the tracking error signal TE. In accordance with the zero crossing timing, the servo controller 10 generates brake pulses in place of the kick pulses. The pulse width or peak value of the brake pulses is controlled in accordance with the degree of disk eccentricity.

Figure 2A:
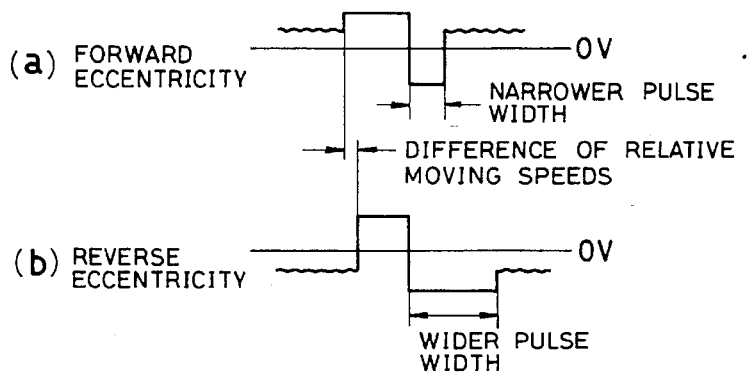
FIG. 2A is a waveform diagram showing brake pulses whose pulse width is varied when the disk is eccentric in the forward direction (part (a)) and when the disk is eccentric in the reverse direction (part (b))
Figure 2B:
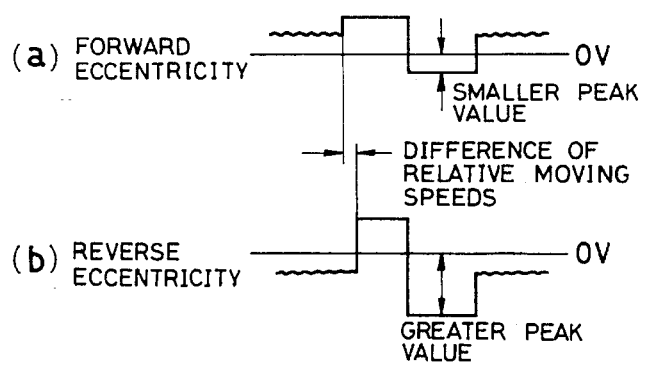
FIG. 2B is a waveform diagram showing brake pulses whose peak value is varied when the disk is eccentric in the forward direction (part (a)) and when the disk is eccentric in the reverse direction (part (b))

Assume that the disk is eccentric in the forward direction relative to the jump direction when the sine waveform coming from the DC extracting circuit 10 is positive, and that the disk eccentricity is in the reverse direction when the same sine waveform is negative. On the above assumption and with reference to FIGS. 2A and 2B, one of two cases occurs. In a case shown in the part (a) where the disk is found to be eccentric in the forward direction relative to the jump direction, the relative speed of movement of the information reading spot is slowed in the disk radius direction on the disk. In this case, the pulse width of the brake pulses is made smaller (FIG. 2A), or the peak value thereof is lowered (FIG. 2B). In a case shown in the part (b) where the disk is eccentric in the reverse direction relative to the jump direction, the relative speed of movement of the information reading spot is raised. In the latter case, the pulse width of the brake pulses is made larger (FIG. 2A), or the peak value thereof is raised (FIG. 2B). Because optimum levels of braking energy are applied in accordance with the relative speed of reading spot movement as described, jump operations remain stable regardless of disk eccentricity.

In the above-described embodiment, the component of disk eccentricity is extracted from the DC component of the driving signal for the actuator 8. Alternatively, the disk eccentricity component may also be extracted from the DC component of the tracking error signal TE.

In the above embodiment, either the pulse width or the peak value of the brake pulses is varied depending on the degree of disk eccentricity. Alternatively, both factors may be varied. All that is needed is that optimum levels of braking energy be made available in accordance with the relative speed of the information reading spot as it moves relative to the disk in the radius direction thereof.

As described, the tracking servo apparatus according to the invention is an apparatus wherein kick pulses are applied to the actuating means for moving the information reading spot of the pickup in the disk radius direction upon generation of a jump command to initiate a jump and brake pulses are applied to the same means at a predetermined point in time during the jump, and wherein the degree of disk eccentricity is detected and at least either the pulse width or the peak value of the brake pulses is varied in accordance with the detected degree of disk eccentricity. In this manner, jump operations when carried out remain stable regardless of disk eccentricity.

What is claimed is:

1. A tracking servo apparatus including a servo loop which opens in response to a jump command to initiate a jump and which closes at the end of said jump, said servo loop having means for generating a tracking error signal in response to deviation of an information reading spot of a pickup in a radius direction relative to a recording track of a disk, and actuating means for positionally compensating said information reading spot in the disk radius direction in accordance with said tracking error signal, said apparatus comprising:

pulse applying means for applying kick pulses to said actuating means when said jump command is generated and for applying brake pulses, having pulse width and peak value, to said actuating means at a predetermined point in time during said jump;

eccentricity detecting means for detecting eccentricity of said disk; and control means for varying at least either the pulse width or the peak value of said brake pulses in accordance with the eccentricity of the disk as detected, wherein said eccentricity detecting means detects said eccentricity of the disk based on a DC component of a signal output from a driver that drives said actuating means.

2. A tracking servo apparatus including a servo loop which opens in response to a jump command to initiate a jump and which closes at the end of said jump, said servo loop having means for generating a tracking error signal in response to deviation of an information reading spot of a pickup in a radius direction relative to a recording track of a disk, and actuating means for positionally compensating said information reading spot in the disk radius direction in accordance with said tracking error signal, said apparatus comprising:

pulse applying means for applying kick pulses to said actuating means when said jump command is generated and for applying brake pulses, having a pulse width and peak value, to said actuating means at a predetermined point in time during said jump;

eccentricity detecting means for detecting eccentricity of said disk; and control means for varying at least either the pulse width or the peak value of said brake pulses in accordance with the eccentricity of the disk as detected, wherein said eccentricity detecting means detects said eccentricity of the disk based on the DC component of said tracking error signal.

3. A control circuit for use with a recording medium playback apparatus, said playback apparatus comprising a pickup device for reproducing at least one of a plurality of tracks formed on a recording medium during a reproduction operation, and an actuator for moving said pickup device transversely across a radial direction of said recording medium during a jump operation, the control circuit comprising:

a brake pulse generator, coupled to said actuator, outputting a brake pulse having a determined pulse width and peak value during a jump operation;

a recording medium eccentricity detector, coupled to said pickup device, detecting an eccentricity of said recording medium; and a control device, coupled to said brake pulse generator, varying at least either said pulse width or said peak value of the brake pulse output by said brake pulse generator in response to the eccentricity of said recording medium as detected by said eccentricity detector, wherein said pickup device generates a tracking error signal representative of a deviation of said pickup device from at least one of the plurality of tracks formed on said recording medium, wherein said eccentricity detector detects the eccentricity of said recording medium based on a direct current (DC) component of said tracking error signal.

4. The control circuit of claim 3, wherein said eccentricity detector comprises a low-pass filter to detect the DC component of said tracking error signal.

* * * * *